US012316741B1

United States Patent
Zhang et al.

(10) Patent No.: US 12,316,741 B1
(45) Date of Patent: May 27, 2025

(54) ADAPTIVE HOMOMORPHIC ENCRYPTION METHOD BASED ON TRUSTED EXECUTION ENVIRONMENT

(71) Applicant: Nanhu Laboratory, Jiaxing (CN)

(72) Inventors: Lei Zhang, Jiaxing (CN); Zehao Li, Jiaxing (CN); Jiachun Liao, Jiaxing (CN); Jinhao Yu, Jiaxing (CN)

(73) Assignee: Nanhu Laboratory, Jiaxing (CN)

( * ) Notice: Subject to any disclaimer, the term of this patent is extended or adjusted under 35 U.S.C. 154(b) by 0 days.

(21) Appl. No.: 18/946,352

(22) Filed: Nov. 13, 2024

(30) Foreign Application Priority Data

Jan. 8, 2024 (CN) .......................... 202410023014.9

(51) Int. Cl.
*H04L 9/06* (2006.01)
*H04L 9/00* (2022.01)

(52) U.S. Cl.
CPC ............ *H04L 9/0618* (2013.01); *H04L 9/008* (2013.01)

(58) Field of Classification Search
CPC ............................ H04L 9/0618; H04L 9/008
See application file for complete search history.

(56) References Cited

U.S. PATENT DOCUMENTS

| | | | | |
|---|---|---|---|---|
| 11,477,006 B2 * | 10/2022 | Williams | ............ | G06F 16/3344 |
| 12,001,577 B1 * | 6/2024 | Xiong | ............ | G06N 3/04 |
| 2021/0211290 A1 * | 7/2021 | Jindal | ............ | H04L 9/008 |
| 2023/0078726 A1 * | 3/2023 | Jing | ............ | H04L 9/088 |
| | | | | 706/12 |
| 2023/0299955 A1 * | 9/2023 | Lee | ............ | H04L 9/14 |
| | | | | 713/171 |
| 2023/0327856 A1 * | 10/2023 | Lu | ............ | H04L 9/085 |
| | | | | 713/171 |

OTHER PUBLICATIONS

Chinese First Office Action with Eng. Translation, Application No. 202410023014.9, Issue No. 2024020700853680, Applicant: Nanhu Laboratory, Title: Adaptive Homomorphic Encryption Method Based on Trusted Execution Environment, Dated: Feb. 7, 2024.
Chines Notification to Grant Patent Right for Invention with Eng. Translation, Application No. 202410023014.9, Issue No. 2024040400070500, Applicant: Nanhu Laboratory, Title: Adaptive Homomorphic Encryption Method Based on Trusted Execution Environment, Dated: Apr. 4, 2024.

* cited by examiner

*Primary Examiner* — Meng Li
(74) *Attorney, Agent, or Firm* — Reising Ethington P.C.

(57) ABSTRACT

Provides is an adaptive homomorphic encryption method based on a trusted execution environment. The method can achieve adaptive configuration and switching of homomorphic encryption parameters and schemes in a chip-level security environment. While ensuring the security of private data and computing results, the efficiency of a homomorphic encryption algorithm is improved, and the usability of different homomorphic encryption algorithms is expanded, thus greatly improving the practicability of a homomorphic encryption method, and promoting the implementation of a privacy protection technology with innovative ideas of integrating different technical routes.

14 Claims, 3 Drawing Sheets

| Scheme | Convolution layer | Max pooling layer | Softmax | Classification | Bootstrapping (After convolution) | Bootstrapping (After pooling) | Speed-up ratio |
|---|---|---|---|---|---|---|---|
| Original homomorphic scheme | 230s | 233s | 66s | | 1442s | 338s | 1x |
| TEE (Bootstrapping) | 230s | 233s | 66s | | 27s | 6s | 4.11x |
| TEE (Bootstrapping+ nonlinear computing) | 230s | 1.8s | 14s | | 27s | 6s | 8.30x |
| Adaptive encoding+ TEE (Bootstrapping+ nonlinear computing) | 0.25s | ~0s | 1.84s | | 0.1s | 0.5s | 858.36x |

FIG. 3

ADAPTIVE HOMOMORPHIC ENCRYPTION METHOD BASED ON TRUSTED EXECUTION ENVIRONMENT

CROSS-REFERENCE TO RELATED APPLICATION

This patent application claims the benefit and priority of Chinese Patent Application No. 202410023014.9, filed with the China National Intellectual Property Administration on Jan. 8, 2024, the disclosure of which is incorporated by reference herein in its entirety as part of the present application.

TECHNICAL FIELD

The present disclosure belongs to the technical field of homomorphic encryption algorithms and confidential computing, and in particular to an adaptive homomorphic encryption method based on trusted execution environment.

BACKGROUND

Privacy computing or confidential calculation based on CPU level is one of the most advanced technologies emerging in the field of information security in recent years, which refers to trusted execution environment based on chip-level trusted base, is not controlled by system layer and kernel layer (that is, even with the highest administrative privilege of a computer system or kernel-level control right, the user still cannot view, tamper with and control the data and operation in this secure environment), thus ensuring the security of data privacy protection and the credibility of operation in the trusted execution environment. At present, the corresponding technologies include Intel SGX, AMD SEV, HYGON CSV, ARM V9CCA, etc. The confidential computing technology has been widely used in general chips and integrated into general-purpose computers and servers in the market, such as Intel Xeon servers and HYGON third-generation servers. Therefore, the confidential calculation/privacy computing based on CPU level is based on the current general chips (such as Intel general-purpose chip based on Intel SGX technology). Meanwhile, the confidential calculation/privacy computing based on CPU level have two most important features as follows:
  (1) privacy protection: encrypted data is decrypted only in the highly trusted environment (encrypted memory) of TEE based on CPU level and supports the calculation; related data in the highly trusted environment is destructed after the computing is completed, and the decrypted plaintext data will not be leaked in the whole process. For example, the privacy protection of related signature keys in the present disclosure is supported; and
  (2) computing credibility: data-based computing runs in in the highly trusted environment (encrypted memory) of TEE based on CPU level, and no one (including the user with the highest permission of the running host or the owner of the kernel-level control right of the system) can invade the CPU-level trusted execution environment and tamper with the calculation. A highly trusted environment of TEE based on CPU level will generate a proof (e.g., in the form of a digital signature) to calculate in the highly trusted environment.

Privacy computing has a particularly important function: trusted sealing technology, such as Intel SGX sealing technology. The trusted sealing technology can directly generate a unique key (which is bound to the host hardware) by the CPU hardware through the instruction set, and encrypt the private data based on the application enclave (safe and trusted environment) in the privacy computing security area and permanently log off. The key cannot be acquired by the outside world or the user with the highest permission of the host.

This encrypted data can only be decrypted on the same host by the same decryption key derived from the CPU hardware through the instruction set by the same application enclave (based on SGX Mrenclave) or by the application enclave (based on SGX MrSigner) developed by the same application developer.

Homomorphic encryption is a special encryption technology, which allows to perform computing in an encrypted state and perform operation on the encrypted data without decrypting the data first. This means that after the encrypted data is operated, the result of decryption is about to be matched with the result of the same operation on the private data. Homomorphic encryption not only protects privacy and security, but also allows the computing in a case of encrypting the data, which is of a great significance in the fields of cloud computing and security multi-party computing. The homomorphic encryption is of a great significance for processing sensitive information and private data safely due to its support to the computing in the encrypted state.

Different homomorphic encryption schemes, such as BGV (Brakerski-Gentry-Vaikuntanathan), GSW (Gentry-Sahai-Waters) and CKKS (Cheon-Kim-Kim-Song), have different advantages, for example, the computing rate of GSW logic calculation is fast, BGV can achieve fast and high-precision integer calculation and can be processed in batches, and CSSK can support floating-point calculation, which is suitable for machine learning tasks such as logical regression.

However, in one computing task, from the start of computing to the end of computing and the execution of decryption, most existing homomorphic encryption schemes cannot be switched to other schemes, generally, one homomorphic encryption scheme is used to compute to the end. A large amount of computing overhead and accuracy loss may be caused even if there is a switching method.

SUMMARY

An objective of the present disclosure is to provide an adaptive homomorphic encryption method based on a trusted execution environment for the above problems. Adaptive configuration and switching of homomorphic encryption parameters and schemes can be achieved in a chip-level security environment based on the computing task.

An adaptive homomorphic encryption method based on a trusted execution environment includes the following steps:
  taking out a current computing task from a task list by a computing side, and executing ciphertext computing based on the current computing task to obtain a ciphertext computing result, and providing the ciphertext computing result and an encryption parameter of the next computing task to a confidential computing environment;
  obtaining a public key of the next computing task, serving the next computing task as the latest current computing task, and repeating above steps until the task list is traversed, and providing a ciphertext computing result of the last computing task to a client;

forming the task list by parsing program code into multiple pairs of combinations of multiple function blocks and encryption parameters, where each function block corresponds to one computing task;

executing, by the confidential computing environment, a decryption algorithm on a current ciphertext computing result provided by the computing side using a private key of the current ask acquired in advance to obtain plaintext of the next computing task, thus generating a public-private key pair for the next computing task; and selecting a corresponding encryption algorithm based on the encryption parameter of the next computing task;

executing the selected encryption algorithm on the plaintext of the next computing task using the public key of the next computing task to obtain transformed ciphertext;

providing the transformed ciphertext and the public key of the next computing task to the computing side;

repeating above steps in the confidential computing environment until the task list is traversed by the computing side, and providing the last generated private key to the client; and executing, by the client, the decryption algorithm on the received ciphertext computing result using the received private key to obtain a plaintext computing result.

The ciphertext computing result of the last computing task is provided to the client, and the rest ciphertext computing results and the encryption parameter of the next computing task are provided to the confidential computing environment. As long as one technical solution has satisfied the above requirements, whether the ciphertext computing result of the last computing task is provided to the confidential computing environment at the same time and whether the rest ciphertext computing results and the encryption parameter of the next computing task are provided to the client will be within the scope of protection of the present disclosure.

A secure transmission connection can be established for the data transmission between the client and the computing side, the data between the client and the computing side can be directly transmitted therebetween or indirectly transmitted by a third party. Similarly, the confidential computing environment and the computing terminal, as well as the confidential computing environment and the client, may be in direct transmission or indirect transmission, as long as the security requirements of the corresponding data are guaranteed. Those skilled in the art cannot avoid the scope of protection by changing the data transmission mode between the confidential computing environment, the computing side and the client to indirect transmission.

In the adaptive homomorphic encryption method based on a trusted execution environment, the client is configured to parse the program code into multiple pairs of combinations of multiple function blocks and encryption parameters to form the task list, and the task list is provided to the computing side.

In the adaptive homomorphic encryption method based on a trusted execution environment, in the computing task list, the public-private key pair of the first computing task is generated by the client, and the private key is provided to the confidential computing environment.

The public-private key pairs of the other computing tasks are generated by the confidential computing environment, and a private key of the last computing task is provided to the client by the confidential computing environment.

In the adaptive homomorphic encryption method based on a trusted execution environment, the public-private key pairs of all computing tasks in the computing task list are generated by the confidential computing environment.

In the adaptive homomorphic encryption method based on a trusted execution environment, in the computing side, ciphertext of the first computing task for computing is acquired through the following ways:

the client selects a corresponding encryption algorithm according to an encryption parameter of the first computing task, and executes the selected encryption algorithm on plaintext data using the public key prepared in advance to obtain the ciphertext. The ciphertext of the first computing task for computing is provided to the computing side. The public key of the first computing task may be generated by the client itself, or generated by the confidential computing environment and provided to the client.

Alternatively, the client provides the plaintext data desired to participate in computing and the encryption parameter of the first computing task to the confidential computing environment, and the confidential computing environment selects the corresponding encryption algorithm based on the encryption parameter of the first computing task, and executes the selected encryption algorithm on the plaintext data using the public key prepared in advance to obtain the ciphertext. The ciphertext of the first computing task for computing is provided to the computing side. Similarly, in this scheme, the public key of the first computing task may be generated by the confidential computing environment, or generated by the client and provided to the confidential computing environment.

In the adaptive homomorphic encryption method based on a trusted execution environment, the method further includes the following steps:

acquiring, by the computing side, the public key used by the ciphertext used by the current computing task obtained by encrypting the plaintext, and directly executing ciphertext computing according to a type of the computing task, or executing confidential computing after executing a corresponding encryption algorithm on the computing parameter of the current computing task using the public key, where the encryption algorithm executed on the computing parameter of the current computing task is also selected according to the encryption parameter of the current computing task, that is, this homomorphic encryption scheme is consistent with the encryption algorithm of the ciphertext which is obtained by encrypting the plaintext by the client or the confidential computing environment and is used by current computing task. The public key of the client side is provided by the client or computing environment.

In the adaptive homomorphic encryption method based on a trusted execution environment, the function block is specific content of a computing function to be executed by the corresponding computing task; and the encryption parameter is a parameter for encrypting data in the execution of the corresponding computing function.

In the adaptive homomorphic encryption method based on a trusted execution environment, composition of the task list is expressed as follows:

task_list=(func_1,crypt_ctx_1),(func_2,crypt_ctx_2), . . . , (func_n,crypt_ctx_n)} task_list is the task list;

func_i in each pair of elements represents the specific content of the computing function to be executed, and crypt_ctx_i represents the parameter for encrypting data in the execution of the corresponding computing function; and i represents the $i^{-th}$ pair of elements, i=1 . . . , n, and n is the number of computing tasks obtained by parsing program code parsing.

In the adaptive homomorphic encryption method based on a trusted execution environment, the encryption parameters include security level, ring dimension, layer budget, multiplication depth, bootstrapping depth, and rotation index. The contents of the encryption parameter are related to corresponding function blocks thereof.

In the adaptive homomorphic encryption method based on a trusted execution environment, the encryption algorithm includes BGV, BFV (Brakerski/Fan-Vercauteren), CKKS, FHEW (Fully Homomorphic Encryption Algorithm), TFHE Fast Fully Homomorphic Encryption over the Torus), Paillier, and EC ElGamal.

A corresponding encryption algorithm is selected according to the encryption parameter.

A secure connection based on trusted authentication is established between the client and the confidential computing environment, and data between the client and the confidential computing environment is transmitted through the secure connection.

The private key acquired in advance is sealed locally in a trusted manner by the confidential computing environment.

The present disclosure has the advantages that:

1. In the homomorphic computing process, the optimal homomorphic encryption scheme can be selected according to the items, thus playing the advantages of the multiple homomorphic encryption schemes, and improving the computing effect.

2. By combining the homomorphic encryption technology with the trusted execution environment mechanism, in the homomorphic computing task, the encryption mechanism can be adaptively switched in the trusted execution environment, the time consumed in the homomorphic computing by integrating multiple homomorphic computing schemes can be greatly reduced, and the accuracy of the homomorphic computing result can be guaranteed at the same time.

3. A method for achieving adaptive configuration and switching of homomorphic encryption parameters and schemes in the chip-level security environment is provided. While ensuring the security of private data and computing results, the efficiency of a homomorphic encryption algorithm is improved, and the usability of different homomorphic encryption algorithms is expanded, thus greatly improving the practicability of a homomorphic encryption method, and promoting the implementation of a privacy protection technology with innovative ideas of integrating different technical routes.

BRIEF DESCRIPTION OF THE DRAWINGS

FIG. 3 shows time-consuming comparison between an adaptive homomorphic encryption method based on a trusted execution environment according to the present disclosure and other multiple homomorphic encryption methods for a homomorphic computing and reasoning task of a convolution neural network CCNN (continuous convolutional neural network).

DETAILED DESCRIPTION OF THE EMBODIMENTS

The present disclosure is further described in detail below with reference to accompanying drawings and specific embodiments.

Figure 1:
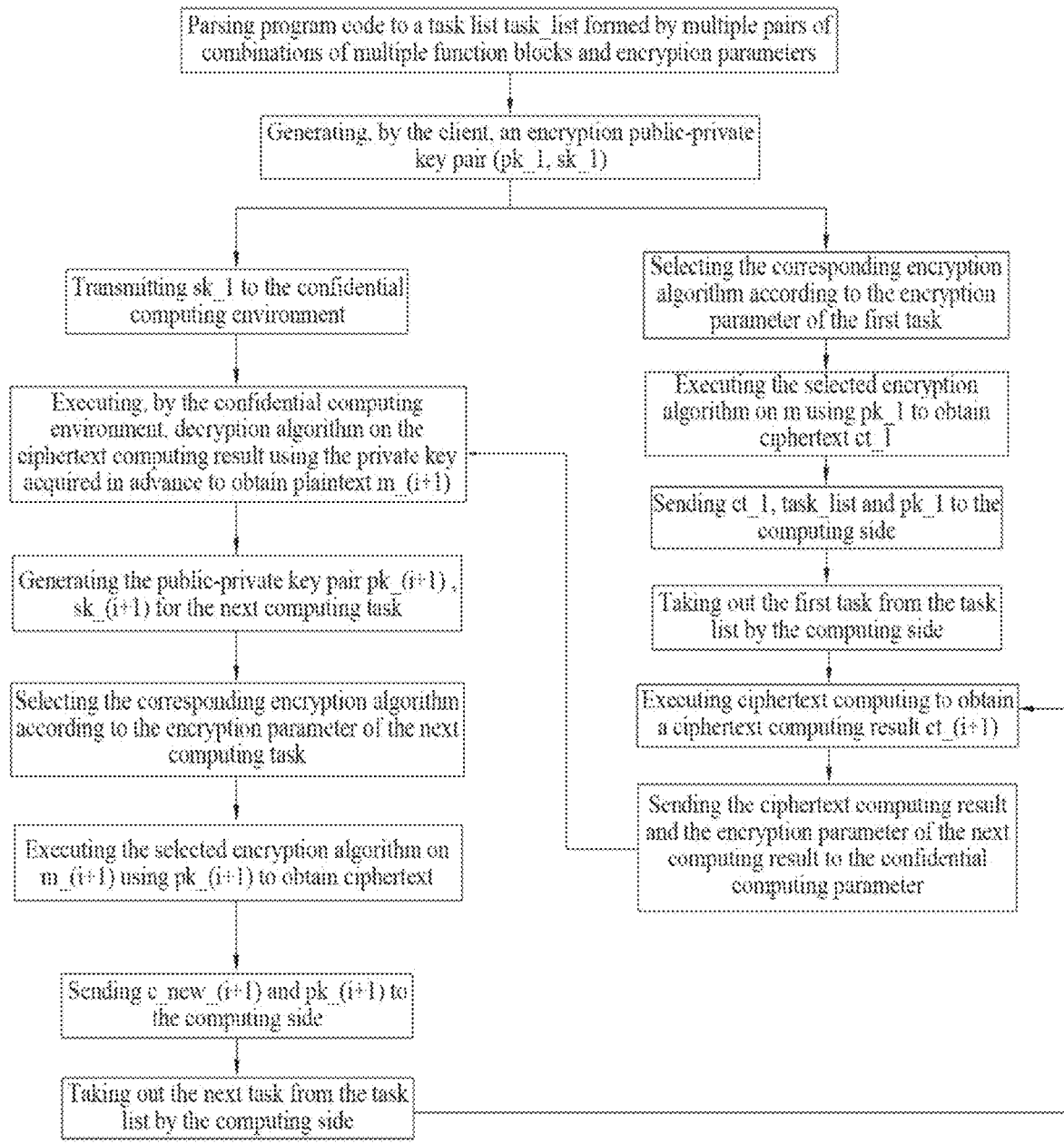
FIG. 1 is a method flow chart of an adaptive homomorphic encryption method based on a trusted execution environment according to the present disclosure.

As shown in FIG. 1, this scheme provides an adaptive homomorphic encryption method based on a trusted execution environment. The method can achieve adaptive configuration and switching of homomorphic encryption parameters and schemes in a chip-level security environment. While ensuring the security of private data and computing results, the efficiency of a homomorphic encryption algorithm is improved, and the usability of different homomorphic encryption algorithms is expanded, thus greatly improving the practicability of a homomorphic encryption method, and promoting the implementation of a privacy protection technology with innovative ideas of integrating different technical routes.

Figure 2:
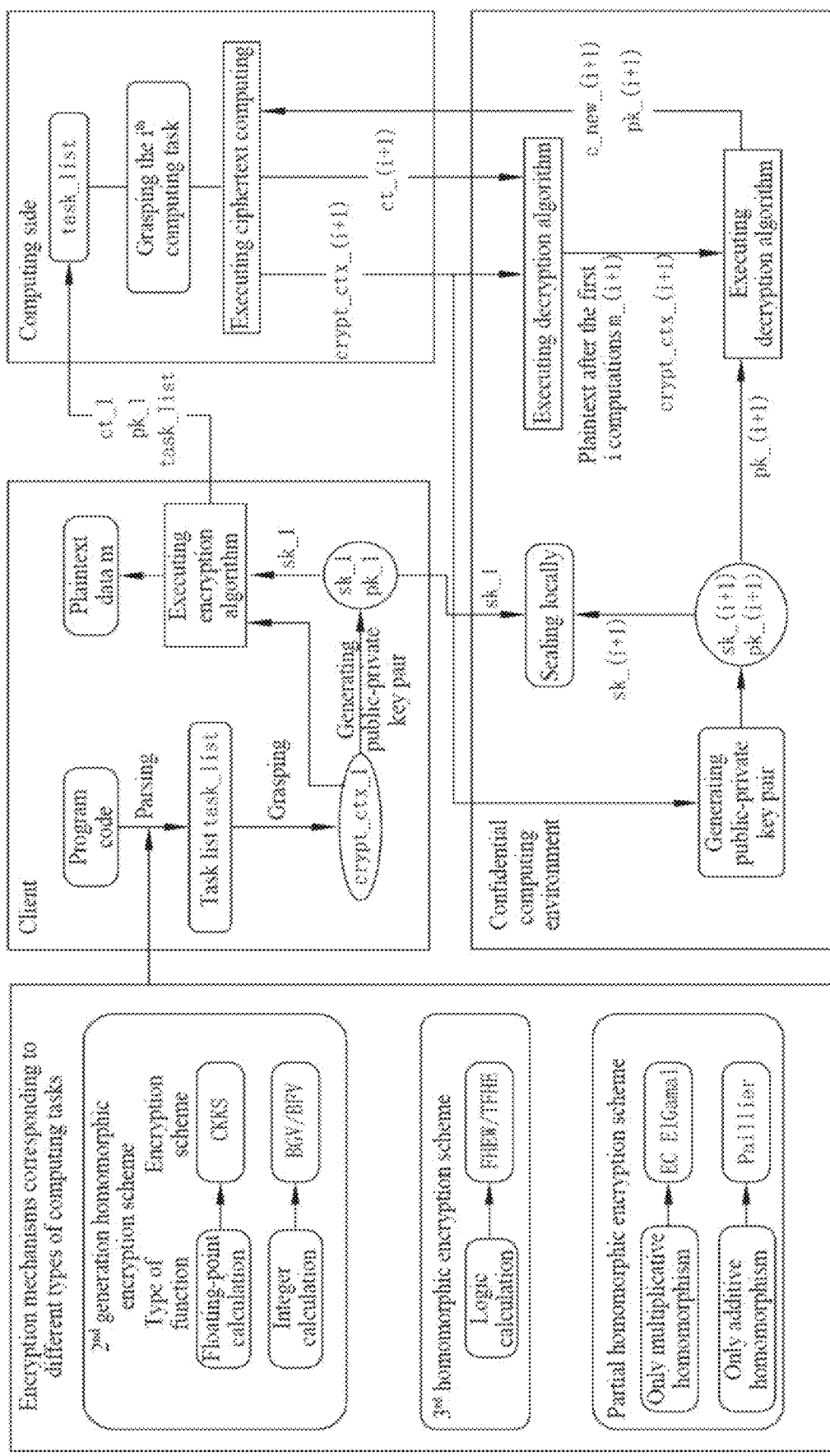
FIG. 2 is a functional block diagram of an adaptive homomorphic encryption method based on a trusted execution environment according to the present disclosure.

As shown in FIG. 1 and FIG. 2, implementation steps of this scheme are as follows:

The client parses the program code into a task list, i.e., task_list={(func_1,crypt_ctx_1),(func_2,crypt_ctx_2), . . . , (func_n,crypt_ctx_n)}, composed of multiple pairs of combinations of multiple function blocks and encryption parameters (func,crypt_ctx).

The pairs of elements in the task list task_list are arranged in order according to the parsed program code. In each pair of elements, func_i represents the specific content of the computing function to be executed, and crypt_ctx_i represents the parameter for encrypting data in the corresponding computing function, which is called the encryption parameter. i represents the $i^{-th}$ pair of elements, i=1 . . . , n, and n is the number of computing tasks for program code parsing.

The encryption parameter crypt_ctx_i includes security level, ring dimension, layer budget, multiplication depth, bootstrapping depth, rotation index and other parameters, and the contents of the parameters are related to corresponding computing function func_i. If the computing task does not include time-consuming nonlinear calculation, the integer computing may employ a BFV/BGV homomorphic encryption scheme, and the floating-point calculation may employ a CKKS homomorphic encryption scheme. If the computing task includes time-consuming nonlinear calculation or logical calculation, FHEW/TFHE scheme can be adopted. If only a partial homomorphism scheme is needed for the computing task, Paillier encryption scheme can be considered for addition and EC ElGamal scheme can be considered for multiplication. In this embodiment, encryption mechanisms corresponding to different types of computing tasks are as shown in the following table:

TABLE 1

Encryption mechanisms corresponding to different types of computing tasks

| Computing task | Type of data | Encryption scheme |
| --- | --- | --- |
| Parallel computing task (e.g., matrix addition/multiplication, polynomial evaluation) | Integer<br>Floating-point number | BGV/BFV<br>CKKS |
| Logic operation, partial nonlinear operation (e.g., comparison, taking the maximum value/minimum value, etc.) | Integer/bit | FHEW/TFHE |

TABLE 1-continued

Encryption mechanisms corresponding to different types of computing tasks

| Computing task | Type of data | Encryption scheme |
| --- | --- | --- |
| Only needing independent addition/multiplication computing | Integer | Paillier/EC ElGamal |

When the method is put into use, it is not limited to the above encryption schemes, and the corresponding relationships between the types of data and the encryption schemes are not limited. Those skilled in the art can select the encryption scheme as required, and the encryption scheme corresponding to each type of data.

After obtaining the task list task_list, the client generates an encryption public-private key pair (pk_1, sk_1) for the first computing task, or the encryption parameter crypt_ctx_1 of the first computing task.

The client establishes a secure connection (such as Intel SGX RA-TLS) with the confidential computing environment (the confidential computing environment refers to the trusted environment based on the chip-level privacy computing, which is the TEE environment in this embodiment) based on remote authentication to perform communication initialization and transmit sk_1 to the confidential computing environment.

The confidential computing environment, after receiving the sk_1, can seal the key sk_1 locally based on a trusted sealing technology (e.g., based on Intel SGX Sealing). The data encrypted and stored locally by a privacy data sealing technology can only be decrypted and read by the exactly same homomorphic encryption application HA running in the confidential computing environment in this machine (whether the application is the same homomorphic encryption application HA can be determined based on a hash value of the relevant data after a verification application is loaded into an encrypted memory). The user with the highest permission of the host or any application running outside the corresponding confidential computing environment or other applications running in the confidential computing environment cannot be read directly. Meanwhile, the user also cannot invade the confidential computing environment for reading.

The client selects a corresponding encryption algorithm HE.Crypt according to the encryption parameter crypt_ctx_1 of the first computing task, and then executes the selected encryption algorithm HE.Crypt on plaintext data m with the public key pk_1 to obtain ciphertext ct_1, and sends ct_1, task_list and the public key pk_1 to the computing side.

The computing side is a fully homomorphic computing side, which is used to provide a homomorphic computing service, with the handling process as follows:

A. The computing side takes out one computing task from the task list task_list, and executes the following handling on each computing task:

the computing parameter is encrypted according to the type of the computing data, for the homomorphic computing supporting ciphertext and plaintext computing, there is no need to encrypt the own computing parameter, and the plaintext is directly used to execute the ciphertext computing. For the homomorphic computing that does not support ciphertext and plaintext computing, the obtained public key pk_i is used to execute the corresponding encryption algorithm (the computing parameter, such as a weight matrix of a machine learning model, etc.) on the computing parameter of the current computing task using the public key pk_i to obtaining ciphertext ct_server_i, then ciphertext computing results ct_(i+1) and crypt_ctx_(i+1) are sent to the confidential computing environment for ciphertext transformation.

The handling process of the confidential computing environment is as follows:

B. The secret computing environment uses a private key sk_i (the first private key sk_1 is issued by the client, and the subsequent private keys are generated by the confidential computing environment and saved in the confidential computing environment) to execute the corresponding decryption algorithm HE.decrypt (selecting the corresponding decryption algorithm selected according to crypt_ctx_i) on the ciphertext computing result ct_(i+1), thus obtaining plaintext m (i+1) after the $i^{-th}$ homomorphic computing. Afterwards, the confidential computing environment generates an encryption public-private key pair (pk_(i+1), sk_(i+1)) for the (i+1)-th computing task, selects the corresponding encryption algorithm HE.Crypt according to the encryption parameter crypt_ctx_(i+1) of the (i+1)-th computing task, and executes the selected encryption algorithm HE.Crypt using the public key pk_(i+1) to encrypt m_(i+1) to obtain ciphertext c_new_(i+1); and the ciphertext c_new_(i+1) and the public key pk_(i+1) are sent back to the computing side.

Step A and Step B are repeated until the task list task_list is empty, that is, all computing tasks have been completed. At this time, the computed ciphertext ct_n is sent back to the client from the computing side, and the confidential computing environment is informed that the computing task has been completed.

It should be noted that in each of the above cycles, the current computing task is expressed as the $i^{-th}$ task, and the next computing task is expressed as the $(i+1)^{-th}$ task. When the current computing task is the first computing task, i=1, and when the current computing task is the last computing task, i=n. Specifically, ct_i and ct_(i+1) represent the ciphertext before and after handling the current computing task, respectively, and c_new_(i+1) represents the ciphertext encrypted by the confidential computing environment using a new homomorphic scheme according to a new computing task after the current computing task is handled. pk_i and sk_i represent a public key and a private key generated for the current computing task, respectively, and pk_(i+1) and sk_(i+1) represent a public key and a private key generated for the next computing task, respectively. m_i and m_(i+1) represent the plaintext of the current computing task and the plaintext of the next computing task, respectively, and so on, which are not listed here one by one.

When the current computing task is switched to the next computing task after being completed, a value of the next computing task is assigned to the value of the latest current computing task. For example, after c_new_(i+1) is sent back to the computing side, as the c_new_(i+1) becomes the ciphertext of the latest current computing task, ct_i=c_new_(i+1) is assigned to the computing side, and the corresponding ciphertext computing is executed with the latest ciphertext ct_i. After the public key pk_(i+1) is sent back to the computing side, the public key pk_i of the latest current computing task is pk_(i+1), the pk_i is enabled to equal to pk_(i+1), and then the computing parameter is encrypted using the public key pk_i of the current computing task to obtain ciphertext. After the confidential computing environment generates the private key sk_(i+1), the private key of the latest computing task is updated to sk_(i+1), that is, sk_i is enabled to equal to sk_(i+1), and the encryption algorithm is executed on the plaintext m_(i+1) of the current computing task (i.e., the computing task to be executed by the computing side) using the latest key sk_i. The others have the same principle, and thus will not be specifically described one by one here.

The confidential computing environment, after receiving a task completion notification sent from the computing side, sends back the last generated private key sk_n to the client through the established secure connection above.

The client, after receiving the final encryption result ct_n sent from the computing terminal and the private key sk_n sent from the confidential computing environment, executes the corresponding decryption algorithm HE.decrypt (similarly, the corresponding decryption algorithm is selected according to crypt_ctx_n) using the private key sk_n to obtain a plaintext result m_n of the last computing. So far, the homomorphic encryption computing is completed.

FIG. 3 time-consuming comparison between an adaptive homomorphic encryption method based on a trusted execution environment according to the present disclosure and other multiple homomorphic encryption methods for a homomorphic computing and reasoning task of convolution neutral network CCNN. As can be seen from FIG. 3 that the adaptive homomorphic encryption method achieved by combining the homomorphic encryption technology with the trusted execution environment mechanism in this scheme can greatly reduce the time consumed by homomorphic computing in the homomorphic computing task and effectively improve the speed of homomorphic computing.

Specific embodiments described in this embodiment are only illustrative of the spirit of the present disclosure. According to the present disclosure, those skilled in the art can make various modifications or supplements to the described specific embodiments or replace them in a similar way, without departing from the spirit of the present disclosure or exceeding the scope defined in the appended claims.

What is claimed is:

1. An adaptive homomorphic encryption method based on a trusted execution environment, comprising the following steps:
    taking out a current computing task from a task list by a computing side, and executing ciphertext computing based on the current computing task to obtain a ciphertext computing result, and providing the ciphertext computing result and an encryption parameter of the next computing task to a confidential computing environment;
    obtaining a public key of the next computing task, serving the next computing task as the latest current computing task, and repeating above steps until the task list is traversed, and providing a ciphertext computing result of the last computing task to a client;
    forming the task list by parsing program code into multiple pairs of combinations of multiple function blocks and encryption parameters by the client, wherein each function block corresponds to one computing task;
    executing, by the confidential computing environment, a decryption algorithm on a current ciphertext computing result provided by the computing side using a private key of the current ask acquired in advance to obtain plaintext of the next computing task, thus generating a public-private key pair for the next computing task; and
    selecting a corresponding encryption algorithm based on the encryption parameter of the next computing task;
    executing the selected encryption algorithm on the plaintext of the next computing task using the public key of the next computing task to obtain transformed ciphertext;
    providing the transformed ciphertext and the public key of the next computing task to the computing side;
    repeating above steps in the confidential computing environment until the task list is traversed by the computing side, and providing the last generated private key to the client;
    executing, by the client, the decryption algorithm on the received ciphertext computing result using the received private key to obtain a plaintext computing result;
    wherein in the computing side, ciphertext of a first computing task for computing is acquired by the client or the confidential computing environment through the following ways and provided to the computing side:
    selecting a corresponding encryption algorithm according to an encryption parameter of the first computing task, and executing the selected encryption algorithm on the plaintext data using the public key prepared in advance to obtain the ciphertext.

2. The adaptive homomorphic encryption method based on a trusted execution environment according to claim 1, wherein in the computing task list, the public-private key pair of the first computing task is generated by the client, and the private key is provided to the confidential computing environment;
    the public-private key pairs of the other computing tasks are generated by the confidential computing environment, and a private key of the last computing task is provided to the client by the confidential computing environment.

3. The adaptive homomorphic encryption method based on a trusted execution environment according to claim 2, wherein in the computing side, the ciphertext of the first computing task for computing is acquired through the following ways:
    selecting, by the client, a corresponding encryption algorithm according to an encryption parameter of the first computing task, executing the selected encryption algorithm on plaintext data using the public key prepared in advance to obtain the ciphertext, and providing the ciphertext of the first computing task for computing to the computing side.

4. The adaptive homomorphic encryption method based on a trusted execution environment according to claim 1, wherein the public-private key pairs of all computing tasks in the computing task list are generated by the confidential computing environment.

5. The adaptive homomorphic encryption method based on a trusted execution environment according to claim 4, wherein the ciphertext of the first computing task for computing is acquired through the following ways: providing, by the client, the plaintext data desired to participate in computing and the encryption parameter of the first computing task to the confidential computing environment, and selecting, by the confidential computing environment, the corresponding encryption algorithm based on the encryption parameter of the first computing task, and executing the selected encryption algorithm on the plaintext data using the public key prepared in advance to obtain the ciphertext, and providing the ciphertext of the first computing task for computing to the computing side.

6. The adaptive homomorphic encryption method based on a trusted execution environment according to claim 1, wherein the method further comprises the following steps:

acquiring, by the computing side, the public key used by the ciphertext used by the current computing task obtained by encrypting the plaintext, and directly executing ciphertext computing according to a type of the computing task, or executing confidential computing after executing a corresponding encryption algorithm on the computing parameter of the current computing task using the public key.

7. The adaptive homomorphic encryption method based on a trusted execution environment according to claim 1, wherein
the function block is specific content of a computing function to be executed by the corresponding computing task; and
the encryption parameter is a parameter for encrypting data in the execution of the corresponding computing function.

8. The adaptive homomorphic encryption method based on a trusted execution environment according to claim 1, wherein composition of the task list is expressed as follows:
task_list=(func_1,crypt_ctx_1), (func_2,crypt_ctx_2), . . . , (func_n,crypt_ctx_n)}
task list is the task list;
func_i in each pair of elements represents the specific content of the computing function to be executed, and crypt_ctx_i represents the parameter for encrypting data in the execution of the corresponding computing function; and
i represents the $i^{-th}$ pair of elements, i=1 . . . , n, and n is the number of computing tasks obtained by parsing program code parsing.

9. The adaptive homomorphic encryption method based on a trusted execution environment according to claim 7, wherein the encryption parameters comprise security level, ring dimension, layer budget, multiplication depth, bootstrapping depth, and rotation index; and the contents of the encryption parameter are related to corresponding function blocks thereof.

10. The adaptive homomorphic encryption method based on a trusted execution environment according to claim 1, wherein the encryption algorithm comprises BGV (Brakerski-Gentry-Vaikuntanathan), BFV (Brakerski/Fan-Vercauteren), CKKS (Cheon-Kim-Kim-Song), FHEW (Fully Homomorphic Encryption Algorithm), TFHE Fast Fully Homomorphic Encryption over the Torus), Paillier, and EC ElGamal;
a corresponding encryption algorithm is selected according to the encryption parameter;
a secure connection based on trusted authentication is established between the client and the confidential computing environment, and data between the client and the confidential computing environment is transmitted through the secure connection;
the private key acquired in advance is sealed locally in a trusted manner by the confidential computing environment.

11. The adaptive homomorphic encryption method based on a trusted execution environment according to claim 2, wherein the method further comprises the following steps:
acquiring, by the computing side, the public key used by the ciphertext used by the current computing task obtained by encrypting the plaintext, and directly executing ciphertext computing according to a type of the computing task, or executing confidential computing after executing a corresponding encryption algorithm on the computing parameter of the current computing task using the public key.

12. The adaptive homomorphic encryption method based on a trusted execution environment according to claim 3, wherein the method further comprises the following steps:
acquiring, by the computing side, the public key used by the ciphertext used by the current computing task obtained by encrypting the plaintext, and directly executing ciphertext computing according to a type of the computing task, or executing confidential computing after executing a corresponding encryption algorithm on the computing parameter of the current computing task using the public key.

13. The adaptive homomorphic encryption method based on a trusted execution environment according to claim 4, wherein the method further comprises the following steps:
acquiring, by the computing side, the public key used by the ciphertext used by the current computing task obtained by encrypting the plaintext, and directly executing ciphertext computing according to a type of the computing task, or executing confidential computing after executing a corresponding encryption algorithm on the computing parameter of the current computing task using the public key.

14. The adaptive homomorphic encryption method based on a trusted execution environment according to claim 5, wherein the method further comprises the following steps:
acquiring, by the computing side, the public key used by the ciphertext used by the current computing task obtained by encrypting the plaintext, and directly executing ciphertext computing according to a type of the computing task, or executing confidential computing after executing a corresponding encryption algorithm on the computing parameter of the current computing task using the public key.

* * * * *